United States Patent [19]

Huusari

[11] 4,421,595

[45] Dec. 20, 1983

[54] PROCESS FOR PREPARING THERMOMECHANICAL PULP WITH HEAT RECOVERY

[75] Inventor: Erkki Huusari, Kaipola, Finland

[73] Assignee: Yhtyneet Paperitehtaat oy Jylhavaara, Valkekeakoski, Finland

[21] Appl. No.: 344,624

[22] Filed: Feb. 1, 1982

Related U.S. Application Data

[63] Continuation of Ser. No. 110,747, Jan. 9, 1980, abandoned.

[30] Foreign Application Priority Data

Jan. 12, 1979 [FI] Finland .................................. 790106

[51] Int. Cl.³ ........................ D21B 1/12; D21C 11/06
[52] U.S. Cl. ...................................... 162/23; 162/28; 162/47; 162/68
[58] Field of Search .................. 162/46, 47, 23, 28, 162/19, 68; 34/35, 86; 241/244, 28

[56] References Cited

U.S. PATENT DOCUMENTS 4,059,237 11/1977 Mannstrom ........................... 162/23
4,231,842 11/1980 Ojula .................................... 162/47
4,235,665 11/1980 Reinhall et al. ....................... 162/46
4,289,579 9/1981 Forsberg ............................... 162/68

Primary Examiner—Steve Alvo
Attorney, Agent, or Firm—Martin Smolowitz

[57] ABSTRACT

Procedure for preparing thermomechanical pulp from wood chips, wherein the chip flow is conducted from a storage reservoir under normal pressure through a first lock feeder into a pressurized steaming chamber, where the chips stay for a few minutes and are heated to an optimum temperature of 100° to 125° C., and from the steaming chamber through a second lock feeder to a feed means which supplies the chips into an enclosed hot refiner. In the procedure the steam discharging from the throat of the refiner against the chip flow is utilized for heating the chips in the steaming chamber, and the steam separated from the mechanical pulp is led off for use elsewhere. The steam utilized for heating the chips is conducted in complete counter-current fashion with regard to the chip flow, that is through the feed means, second lock feeder, steaming chamber, first lock feeder and reservoir under normal pressure into the open atmosphere, and the refining of the chips is carried out at a substantially higher temperature than the heating of the chips preferably not less than 135°.

3 Claims, 1 Drawing Figure

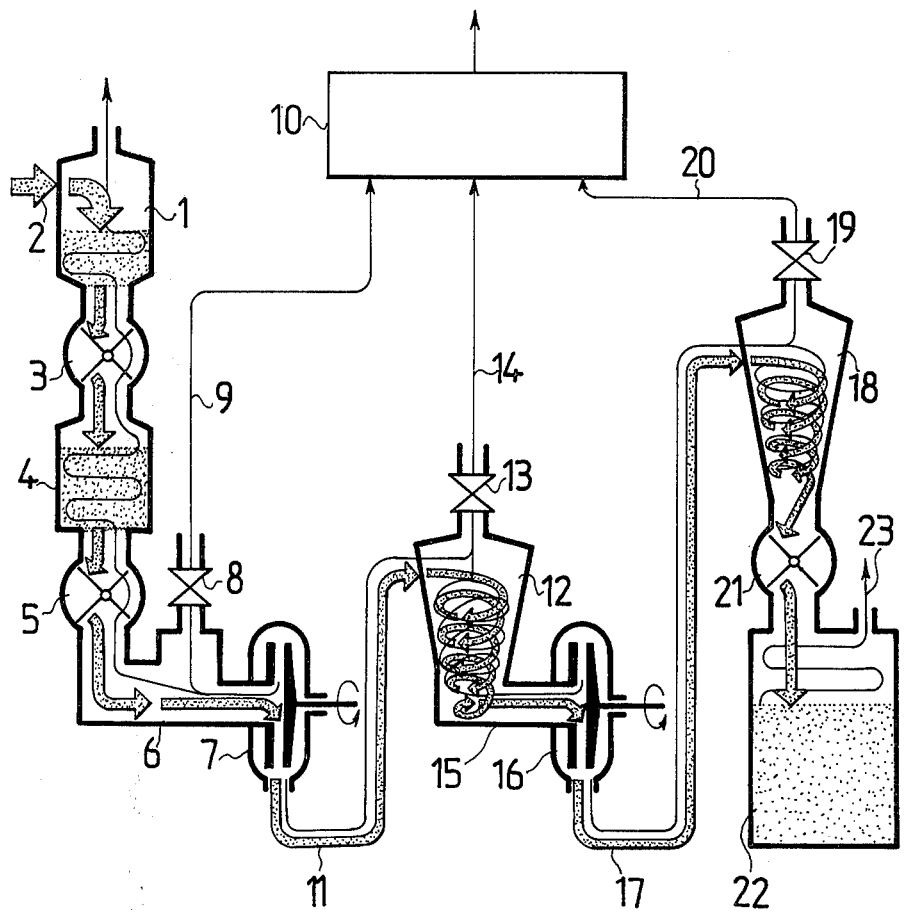

PROCESS FOR PREPARING THERMOMECHANICAL PULP WITH HEAT RECOVERY

This is a continuation of application Ser. No. 110,747, filed Jan. 9, 1980, now abandoned.

BACKGROUND OF INVENTION

The proportion of mechanical pulps used as raw material in the manufacturing of paper has been rapidly increasing over recent years. The competitive quality of mechanical pulps was mainly created by thermomechanical pulp which is produced by attrition-refining wood splinters between two refiner disks. In the preparation of thermomechanical pulp, an elevated temperature is used in order that the lignin might soften and the fibers might separate without being ruptured. In addition, fiber friction work takes place between the refiner disks, and this favorably fibrillates the fibers, together with the fiber/grinder disk friction work. This fibrillation of fibers endows the paper made of such pulp stock with greater strength than does the fiber produced in cold attrition refining or in stone refining. This manufacturing method has been known in principle for a long time. Only in the most recent years has the procedure begun to be more widely adopted. The causes of such development have been, in the first place, the increase in price of the wood raw material and the technical development of the thermomechanical pulp producing equipment.

While the thermomechanical pulp technology has been rapidly developing, attention has also begun to be paid to the high consumption of electricity in this process. A typical thermomechanical pulp installation consumes about 1800 to 2000 kWh of electric energy per ton of pulp. Since evidently the efficiency of the difibration itself is below 1%, virtually all of the shaft power that is put in has converted to heat. But, as it is generally judged, heat is no practical utility in itself; its usability depends on how far its temperature exceeds that of the next source of heat with abundant availability.

It is generally stated regarding thermomechanical pulp processes that as soon as the temperature rises over a certain limit, for instance 127° C. for spruce, the lignin will soften excessively and spread as a molten product over the surface of the fiber material that is being ground, thereby preventing the formation in the paper manufacturing process of the hydrogen bridges, which are typical of cellulose. Owing to this, in favorably operating thermomechanical pulp installations the temperature and the equivalent saturated steam pressure are controlled so such that this temperature is not surpassed. A typically favorable preheating and refining temperature actually used is about 120° C. and the equivalent steam pressure is, about 200 kPa.

However, these temperatures and pressures mentioned do not yet enable the usability of said steam in typical steam consumption applications. It is, naturally, always possible to compress steam of an arbitrary pressure to any given pressure and temperature, but this involves separate extra costs. Heat has been recovered from steams with pressure as mentioned, by contacting the steam with water, whereby hot water is obtained. But as a rule hot water of 70° to 90° C. is a commodity found in abundance in paper mills.

The heat recovery systems of many thermomechanical pulp processes have moreover been encumbered by the particular drawback that the steam obtained either directly from the refiner or from the refiner through a preheater contains large amounts of air, in fact typically 10% by volume. If it is contemplated, e.g. out of corrosion considerations, to heat exchange this raw steam for pure steam, major difficulties will be experienced in the heat exchange process owing to the low condensation heat transfer coefficient due to the air content.

SUMMARY OF INVENTION

The object of the present invention is therefore a procedure for the preparation of thermomechanical pulp from wood chips and wherein the chip flow is conducted from storage under normal pressure through a first lock feeder into a pressurized steaming chamber, where the chips are retained a few minutes and heated to an optimum temperature of 100° to 125° C., and from the steaming chamber through a second lock feeder into an enclosed feeding means supplying the chips into a hot refiner, and in said procedure the steam discharging from the throat of the refiner against the chip flow being employed to heat the chips in the steaming chamber, and the steam separated from the mechanical pulp being conducted, for the purpose of its utilization, to a heat exchanger.

The object of the invention is: to provide an ideal thermomechanical pulp manufacturing process wherein the highest possible fraction of the shaft input power can be recovered in the form of steam as pure as possible and which may be removed from the installation at the highest possible temperature.

The procedure of the invention is characterized in that the steam used to heat the chips is conducted in complete counter-current fashion with reference to the chip flow, that is through a feed means, a second lock feeder, a steaming chamber, a first lock feeder and a storage reservoir under normal pressure into the atmosphere, and that the refining of the chips is carried out at a temperature substantially higher than that at which the chips are being heated.

The experiments which led to the present invention revealed that steam conducted in complete counter-current direction to the chip flow effectively prevents the entraining of air in the process. It is important with this in mind that this part of the steam is also conducted through the chip reservoir under normal pressure. The steam will then contain air in abundance, for which reason it is freely vented.

It has been found unexpectedly that in the refiner itself the temperature in itself is no decisive factor regarding the covering of the fibers with softened lignin. Therefore, as taught by the present invention, the refining is performed at a temperature substantially higher than that of the chip preheating. As a consequence, the steam to be recovered will be obtained at a substantially higher temperature than heretofore. Moreover, the recovered steam contains air only between 0.1 and 0.06% by volume. Thus, the air content is a minimal fraction of the that in procedures of prior art. This low air quantity enables the steam of relatively high pressure to be utilized at typical steam using points of the plant.

A favorable embodiment of the invention is characterized in that part of the steam discharging to the feed means from the throat of the refiner is conducted to a heat exchanger and that for the purpose of controlling the refining temperature this steam flow is more or less strongly throttled. The greater the throttling applied to the steam flow, the higher will the refining temperature rise. The refining is most appropriately carried out at a temperature of at least 135° C. This lower temperature limit carries significance in that the nearly airless steam obtained contains, for instance, formic and acetic acids, which give rise to corrosion, and resin and fatty acids, which are deposited on the hat exchange surfaces and produce dirt layers on them which hamper the heat transfer. It has unexpectedly been found in experiments that were carried out, that corrosion and typical soiling of the heat transfer surfaces no longer occur in practice if the temperature of the condensing unclean steam is not less than 135° C. This is believed to be explainable by the circumstance that water condensing at a higher temperature is better able to dissolve the said acids and will therefore, as it escapes from the heat transfer surface, continuously carry off such dirt deposits.

The present invention also concerns a means for carrying out the procedure, comprising for the chip flow a reservoir under normal pessure, a first lock feeder, a steaming chamber,, a second lock feeder, a feed means, and one or several consecutive hot refiners, after each such refiner there being disposed a cyclone for separating the steam from the mechanical pulp, the steam being conducted from such cyclones to a joint heat exchanger. The means is characterized in that the feed means of the first refiner is connected by a steam conduit fitted with a throttling valve, to a heat exchanger.

DESCRIPTION OF INVENTION

The invention is described in the following the aid of an example, with reference being made to the attached drawing presenting, schematically, an embodiment of the procedure and means.

In the drawing, reference numeral 1 indicates the chip reservoir under atmospheric pressure, and into which are supplied chips in the direction indicated by the arrow 2. The numeral 3 refers to a first lock feeder, which feeds a constant rate chip flow into the steaming chamber 4. On the other hand, the lock feeder 3 feeds, in the opposite direction, a steam flow, which preheats the chips residing in the reservoir 1 and pushes out air therefrom. In the steaming chamber 4, the chips are heated to optimum defibrating temperature, which is freely selectable in accordance with the operating principle of the system. For instance when manufacturing newsprint pulp, this temperature will be 100° to 125° C., depending on the timber species. The chips stay a few minutes in the steaming chamber, so that the residence time of all particles is approximately the same. The chips depart from the steaming chamber 4 at a constant rate flow through the second lock feeder 5 into the feed means 6, which has not been more closely depicted, but which may be a screw conveyor, known for use in this connection. At the same time, the second lock feeder 5 feeds steam from the feed means 6 into the steaming chamber 4.

The feed means 6 continuously pushes chips into the throat of the enclosed hot refiner 7. The refiner 7 generates steam, of which part departs along with the mechanical pulp through the refiner's periphery. Another part of the steam escapes through the throat of the refiner, against the chip flow. Part of this steam, again, passes through the feed means 6, the second lock feeder 5, the steaming chamber 4, the first lock feeder 3 and the chip reservoir 1 into the open atmosphere. Since this part of the steam runs completely counter-current to the chip flow, it serves efficiently to remove air from the system. Another part of the steam discharging from the throat of the refiner 7 is conducted through the steam conduit 9, fitted with a throttling valve 8, into a heat exchanger 10, preferably of the condenser/evaporator type. The throttling valve 8 is used to control the temperature and pressure in the refiner 7. The valve 8 is throttled to such an extent that grinding will take place at a temperature not lower than 135° C., whereby the equivalent pressure in the refiner will be at least 350 kPa. In the trials performed up to now, no upper limit for the temperature or pressure has been found. It is obvious, at all events, that the usability of the steam gained from the process increases with increasing temperature and pressure. On the other hand, the temperature cannot be raised to any great height without damaging the fibers.

The mechanical pulp derived from the refiner 7, which is accompanied by steam, departs from the refiner's periphery through the conduit 11 to the cyclone 12. Here, the mechanical pulp settles downwardly, and the steam goes through the steam conduit 14, provided with a throttling valve 13, to the heat exchanger 10. The feed means 15 and refiner 16 may be of the same kind as the feed means 6 and refiner 7 presented before. The steam discharging from the throat of the refiner 16 against the mechanical pulp flow goes through the feed means 15, cyclone 12 and steam conduit 14 to the heat exchanger 10.

The finished mechanical pulp, accompanied by steam, departs from the periphery of the refiner 16 through the conduit 17 to the cyclone 18, where the steam separates and goes through the conduit 20, provided with throttling valve 19, to the heat exchanger 10 from which condensate is removed at conduit 24. The mechanical pulp settles downwardly in the cyclone 18 and departs through the third lock feeder 21 into the container 22, whence it may be transported to any desired point. It is clear that thereby a slight over-pressure prevails in the container 22, and which discharges to the atmosphere as the arrow 23 shows. so that the entrance of air into the process is prevented. The solids content of the pulp in the container 22 is about 45% or higher.

It is obvious to a person skilled in the art that different embodiments of the invention may vary within the scope of the claims following below. It has been disclosed in the foregoing, and demonstrated in the drawing, that the process comprises two consecutive refiners 7 and 16, but the invention may also be applied in connection with a process comprising in consecutive arrangement more than two refiners.

I claim:
1. An improved process for preparing thermomechanical pulp from wood chips, comprising:
   (a) heating wood chips with process-generated steam in a storage reservoir at atmospheric pressure, and conducting the heated chips through a first lock feeder into a pressurized steaming chamber countercurrent to the steam flow, which further heats said chips in said pressurized chamber to a temperature of 100°–125° C.;
   (b) passing the further heated chips from said pressurized chamber through a second lock feeder into feeding means for supplying the chips into an enclosed hot refiner, and producing wood pulp and pressurized steam therein at a refining temperature not less than about 135° C.;
   (c) discharging a first portion of the steam from said refiner in complete countercurrent fashion to the chip flow successively back through said feeding means, second lock feeder, pressurized steaming chamber, first lock feeder and storage reservoir to progressively heat the chips, throttling a second portion of the steam to maintain the desired steam pressure and temperature in the hot refiner, and passing the throttled second portion of the steam to a heat exchanger for recovery of process heat;

(d) passing wood pulp along with a third portion of pressurized steam from said first refiner to a first cyclone separator, and passing seperated steam from said first cyclone seperator throttled to lower pressure to said heat exchanger for recovering process heat; and (e) passing the remaining wood pulp to a second refiner, from which the wood pulp and accompanying steam are passed to a second cyclone separator, from which recovered steam is throttled to a lower pressure and passed to said heat exchanger, and the pulp is passed through a third lock feeder to a container from which the remaining steam is vented to the atmosphere to prevent air from entering the process.

2. The process according to claim 1, wherein said recovered steam contains air between about 0.1 and 0.06% by volume.

3. The process according to claim 1, wherein the solids content of the pulp in said container is at least about 45%.

* * * * *